(12) United States Patent
Ogden et al.

(10) Patent No.: US 10,242,582 B1
(45) Date of Patent: Mar. 26, 2019

(54) VISUALIZATION OF GLIDE DISTANCE FOR INCREASED SITUATIONAL AWARENESS

(71) Applicant: Rockwell Collins, Inc., Cedar Rapids, IA (US)

(72) Inventors: Collin D. Ogden, North Liberty, IA (US); Ryan C. Palmer, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 82 days.

(21) Appl. No.: 15/242,280

(22) Filed: Aug. 19, 2016

(51) Int. Cl.
*G08G 5/02* (2006.01)
*G08G 5/00* (2006.01)
*B64D 25/00* (2006.01)

(52) U.S. Cl.
CPC ............. *G08G 5/025* (2013.01); *B64D 25/00* (2013.01); *G08G 5/0021* (2013.01); *G08G 5/0039* (2013.01)

(58) Field of Classification Search
CPC .... G08G 5/025; G08G 5/0039; G08G 5/0021; B64D 25/00
See application file for complete search history.

(56) References Cited

U.S. PATENT DOCUMENTS

| 2014/0309821 A1* | 10/2014 | Poux | G08G 5/0021 701/14 |
| 2014/0343765 A1* | 11/2014 | Suiter | G08G 5/0056 701/18 |
| 2017/0162062 A1* | 6/2017 | Kushwaha | G08G 5/0056 |

* cited by examiner

*Primary Examiner* — Anne M Antonucci
(74) *Attorney, Agent, or Firm* — Donna P. Suchy; Daniel M. Barbieri

(57) ABSTRACT

A system for assisting an aircraft in an emergency landing includes a processor with a non-transitory processor-readable medium storing processor-executable code. The processor-executable code causes the processor to detect an all engine failure of an aircraft. In response to the detected all engine failure, the processor-executable code further causes the processor to determine at least one of an aerodynamic and environmental attribute associated with the aircraft and a descent rate of the aircraft based on the at least one aerodynamic and environmental attribute, calculate a maximum distance the aircraft can travel without engine power based on at least one of the attribute and descent rate; calculate a range for the aircraft based on the maximum distance; and generate a display of the range and provide the display to a display system of the aircraft.

20 Claims, 8 Drawing Sheets

VISUALIZATION OF GLIDE DISTANCE FOR INCREASED SITUATIONAL AWARENESS

BACKGROUND

The inventive concepts disclosed herein relate generally to the field of emergency operation of an aircraft. More particularly, embodiments of the inventive concepts disclosed herein relate to assisting a pilot in determining the glide distance of an aircraft during an engine shutdown or other malfunction.

In the event that an aircraft loses functionality of its engines, whether from insufficient fuel or from engine malfunction, a pilot of the aircraft must maneuver the aircraft and make an emergency landing without any forward thrust (i.e., by gliding the aircraft). The pilot may be aware of emergency landing locations determined prior to takeoff, but the pilot may not be certain if the aircraft is able to glide far enough to reach an emergency landing location. Furthermore, when the engines of an aircraft fail, a flight management system of the aircraft may also shut down or malfunction, leaving the pilot to estimate a range that the aircraft can glide given the current altitude of the aircraft.

SUMMARY

In one aspect, the inventive concepts disclosed herein are directed to a system for assisting an aircraft in an emergency landing. The system includes at least one processor with a non-transitory processor-readable medium storing processor-executable code. The processor is configured to detect an all engine failure of an aircraft. In response to the detected all engine failure, the processor is further configured to determine at least one of an aerodynamic and environmental attribute associated with the aircraft and a descent rate of the aircraft based on the at least one aerodynamic and environmental attribute; calculate a maximum distance the aircraft can travel without engine power due to the all engine failure based on at least one of the attribute and descent rate; calculate a range for the aircraft based on the maximum distance; and generate a display of the range and provide the display to a display system of the aircraft.

In a further aspect, the inventive concepts disclosed herein are directed to a system for assisting an aircraft in an emergency landing. The system includes at least one processor with a non-transitory processor-readable medium storing processor-executable code. The processor is configured to detect an all engine failure of an aircraft. In response to the detected all engine failure, the process is further configured to determine at least one of an aerodynamic and environmental attribute associated with the aircraft and a descent rate of the aircraft based on the at least one aerodynamic and environmental attribute; calculate a maximum distance the aircraft can travel for a plurality of directions; calculate a plurality of driftdown flight plans based on the maximum distance the aircraft can travel for each direction of the plurality of directions and based the locations of a plurality of landing locations; select a driftdown flight plan from the plurality of driftdown flight plans; and generate a display of the selected driftdown flight plan and provide the display to a display system of the aircraft.

In a further aspect, the inventive concepts disclosed herein are directed to a method for assisting an aircraft in an emergency landing. The method includes detecting an all engine failure of an aircraft. The method further includes, in response to the detected all engine failure: determining at least one of an aerodynamic and environmental attribute associated with the aircraft and a descent rate of the aircraft based on the at least one aerodynamic and environmental attribute; calculating a maximum distance the aircraft can travel without engine power due to the all engine failure based on at least one of the attribute and descent rate; calculating a range for the aircraft based on the maximum distance; and generating a display of the range and provide the display to a display system of the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
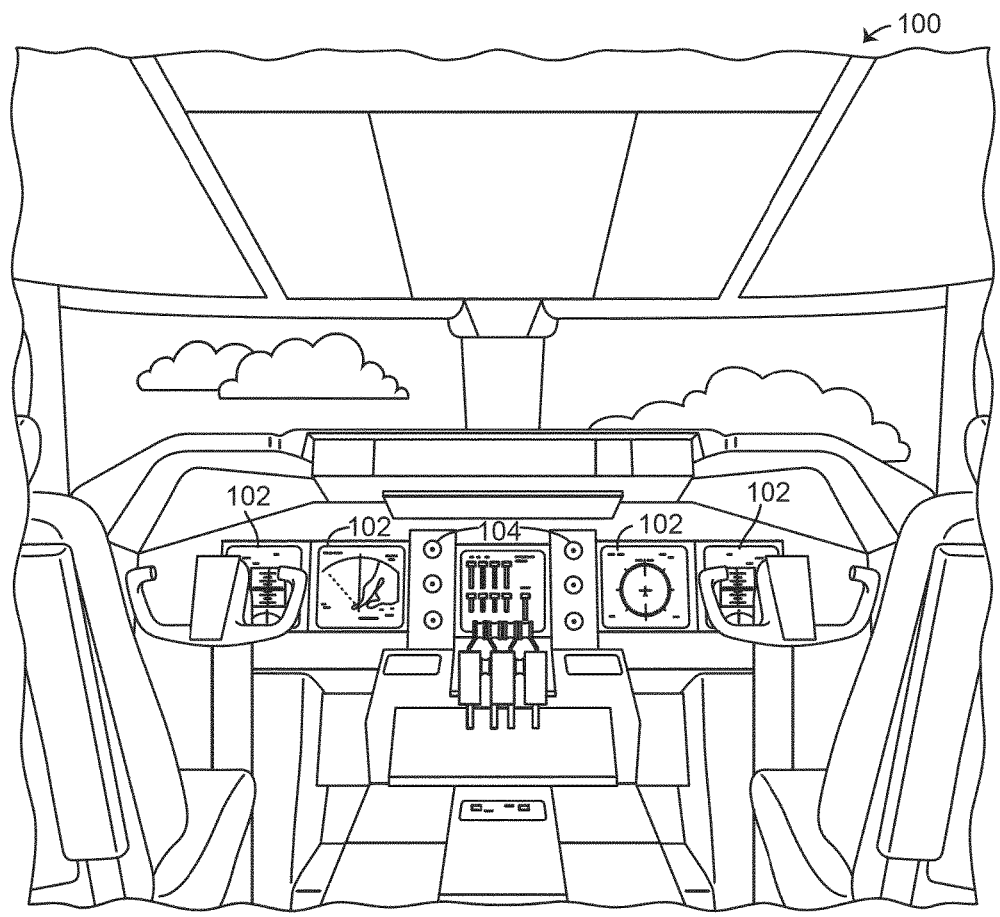
FIG. 1 is a schematic illustration of a control center of an aircraft including a display, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to providing assistance to a pilot of an aircraft in a multiple engine failure scenario. The inventive concepts disclosed herein can be utilized in a number of control systems for various types of applications, sensing systems, and display systems. While the present disclosure describes systems and methods implementable for providing assistance for a pilot of an aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles or and objects.

Referring generally to the figures, systems and methods are shown and described for providing guidance to a pilot of an aircraft when a single or multiple engine failure has occurred such that the aircraft is not able to maintain level flight at any altitude. More particularly, a display may be provided to the pilot that provides a driftdown flight plan that details a route for the aircraft from its current location and state to a landing area or other target area.

When all engines of an aircraft fail, various data (e.g., flight characteristics, aerodynamic characteristics) from a flight management system (FMS) of the aircraft may be used to provide a better estimate of a gliding range (e.g., the distance the aircraft can travel during an unpowered descent) of the aircraft. Such data may include, for example, the current altitude, weight, and speed of the aircraft, drag data, the terrain, atmospheric or weather conditions. Providing a better estimate for the gliding range of the aircraft may increase safety by reducing pilot workload in determining the most suitable location or possible locations to attempt an emergency landing. The inventive concepts disclosed herein determine the most suitable landing location or possible landing locations based on an estimated gliding range of the aircraft. Providing the pilot with relevant and accurate information quickly, and with little to no manual interaction required, removes the need for the pilot to make estimates during a high-workload scenario.

Referring to FIG. 1, a schematic illustration of an aircraft control center 100 is shown according to an embodiment of the inventive concepts disclosed herein. The aircraft control center 100 includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein. For example, the flight displays 102 may be configured to generate a display during an engine failure scenario, detailing a driftdown flight plan for a pilot of the aircraft.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
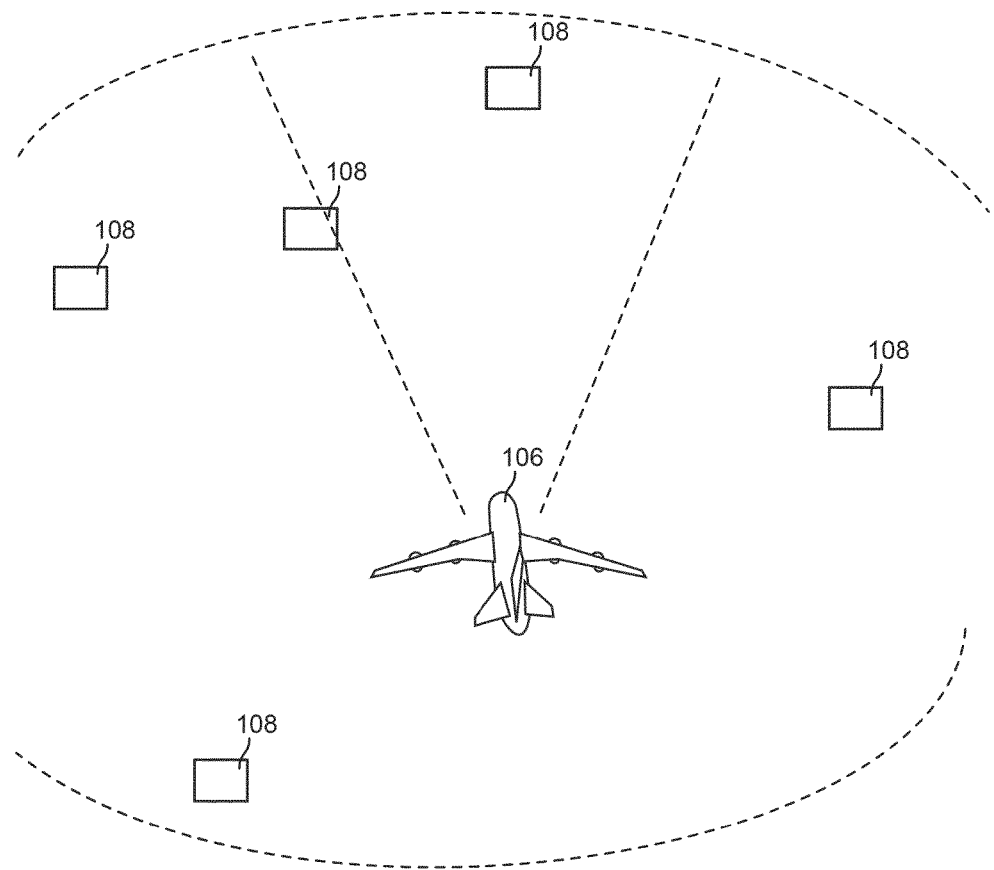
FIG. 2 is an illustration of an aircraft and a plurality of landing locations, according to the inventive concepts disclosed herein.

Referring now to FIG. 2, an illustration of an aircraft 106 within range of a plurality of landing locations 108 is shown according to the inventive concepts disclosed herein. An engine failure scenario or other similar emergency scenario may occur, for example, because of an engine malfunction or a loss of fuel (running out of fuel or fuel flow issues), wherein the aircraft 106 is unable to reach its destination and has to make an emergency landing in an unexpected location.

A flight management system of the aircraft 106 may then determine emergency landing locations based on a number of factors as described in the present disclosure. For example, the flight management system may take into account aerodynamic attributes such as an aircraft weight, the lift or drag on the aircraft, the current aircraft speed, and the like, in order to determine how far the aircraft 106 can glide before reaching the ground. As another example, the flight management system may take into account environmental attributes such as the current temperature, humidity, wind, and other weather conditions that can impact how far the aircraft 106 can glide. The flight management system may then generally identify a range or an area that the aircraft 106 can reach before reaching the ground. The range or area may not be a uniform area, as the flight management system may identify aerodynamic or environmental attributes that prevent or restrict gliding in a particular direction, or one or more ground characteristics that prevent a landing in a particular area.

The flight management system may generally identify one or more potential landing locations 108 within the range of the aircraft 106. The landing locations may be in any direction from the aircraft, including in front of the aircraft or behind the aircraft. For example, in FIG. 2, one potential landing location 108 may be behind the aircraft 106. In various embodiments, the flight management system may be configured to display a fixed number of landing locations 108 for the pilot (e.g., five locations as shown in FIG. 2). In one embodiment, the flight management system may identify only locations in front of the aircraft, identifying locations that the aircraft can reach without making significant turns. In another embodiment, the flight management system may identify locations reachable after a turn, accounting for the ramifications (e.g., loss of altitude, time, and velocity) of the turn when determining if the location is reachable.

Figure 3:
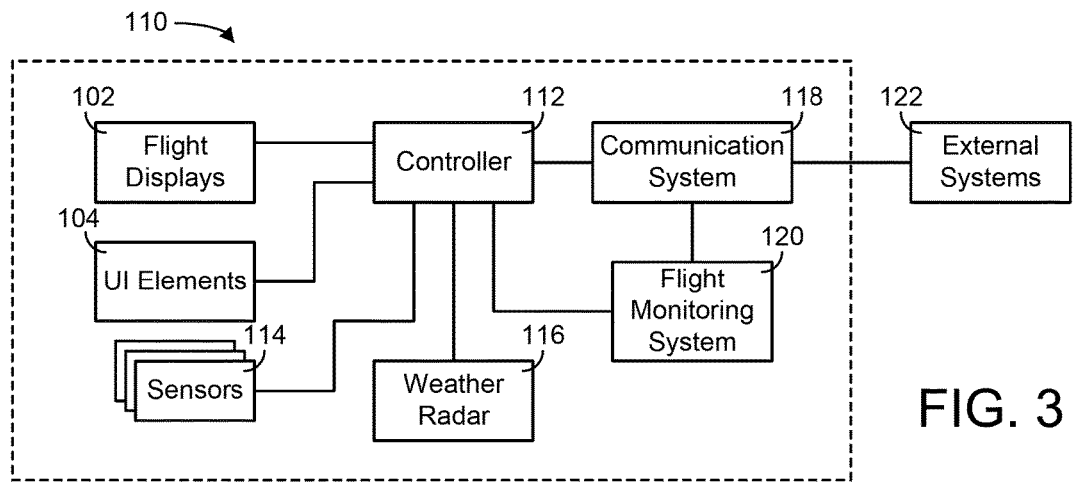
FIG. 3 is a block diagram of a flight management system for assisting a pilot during an engine malfunction scenario, according to the inventive concepts disclosed herein.

Referring to FIG. 3, a block diagram of the flight management system 110 including a controller 112 is shown according to the inventive concepts disclosed herein. The flight management system 110 includes a controller 112, the flight displays 102 and UI elements 104, a plurality of sensors 114, a weather radar system 116, an flight monitoring system 120, and a communication system 118. The flight management system 110 may include other systems and components for general aircraft operation.

The controller 112 is configured to send data to and receive data from, or otherwise facilitate electronic data communications, with the other systems of the flight management system 110 or with remote systems such as satellite-based systems or ground-based systems. The controller 112 may further interface with an aircraft control system, aircraft monitoring system, or other such system. The controller 112 may be configured to generally receive input from the various other systems and generate a driftdown flight plan for a pilot based on the input. The activities of the controller 112 are shown in greater detail in FIG. 4. In various embodiments, the controller 112 may be configured to perform any of the actions described with any of the various other systems of the flight management system 110 as described herein.

The plurality of sensors 114 may include, for example, one or more fuel sensors, airspeed sensors, location tracking sensors (e.g., GPS), lightning sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to or remote from the aircraft. The plurality of sensors 114 may include one or more sensors configured to acquire air data indicative of at least one air characteristic (e.g., a pressure, an indicated airspeed, a true airspeed, an angle of attack, a pitch angle, an altitude, a temperature) of an environment surrounding the aircraft 106. The sensors may be located in various positions on the aircraft 106, and a single sensor may be configured to acquire more than one type of sensor data. Data from the sensors 114 is output to the controller 112 for further processing and display as described below.

The weather radar system 116 may be a system for detecting weather patterns, such as wind patterns. For example, the weather radar system 116 may acquire wind data such as a wind speed, a wind direction, forecasted winds, a magnetic heading, a cross-track, and the like. The wind data may be transmitted from the weather radar system 116 to the controller 112 for determining an impact on the aircraft during an engine failure scenario as described herein. The weather radar system 116 may further estimate wind data using wind models for a particular location, altitude, and time of a flight and/or based on previously measured wind data. The weather radar system 116 may further detect other weather conditions (e.g. precipitation, temperature, humidity) that may impact the aircraft 106. Data from the weather radar system 116 is output to the controller 112 for determining an impact of the weather conditions on the aircraft 106 during driftdown of the aircraft 106.

The flight monitoring system 120 may be or include at least one of a GPS, a Global Navigation Satellite System (GNSS), an altitude heading and reference system (AHRS), and an inertial reference system (IRS). The flight monitoring system 120 is configured to acquire flight data indicative of at least one flight characteristic of the aircraft 106. The flight characteristics may include, for example, a ground speed, a vertical speed, a pitch angle, or an altitude of the aircraft 106. Data from the flight monitoring system 120 is output to the controller 112 for determining an impact of the flight characteristics on the aircraft 106 during driftdown of the aircraft 106.

The communication system 118 facilitates communications between the controller 112 and an external system 122 (e.g., a satellite system, other aircraft, a terrestrial station, or other air, space, or ground-based system). For example, the communication system 118 may send data to and receive data from external ground-based weather supplier systems and ground-based air traffic control systems. The communication system 118 may communicate with the external system 122 using any type of communication protocol or network (e.g., via a mobile network, via one or more bi-directional or uni-directional communication channels) and may include any type of wired or wireless interface for facilitating the communication. It should be understood that the information received by the controller 112 as described in the present disclosure may come from any internal or external source.

Figure 4:
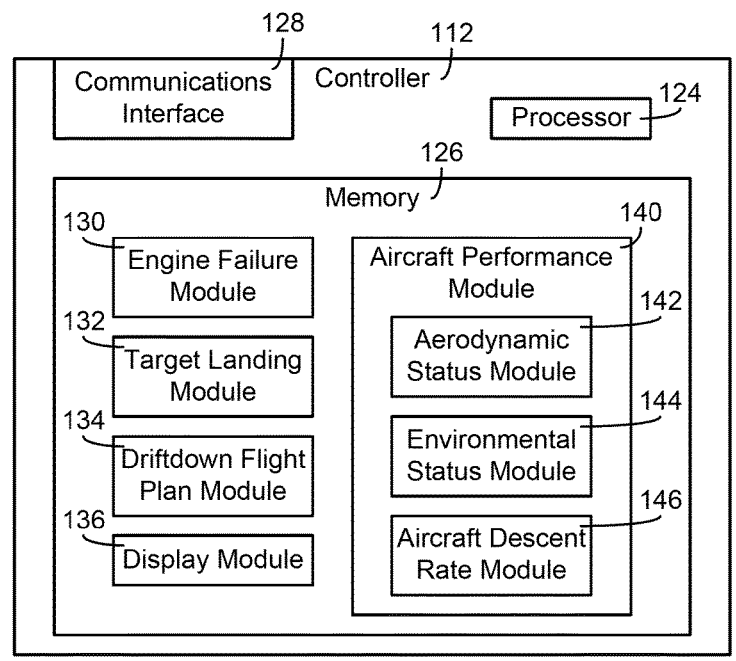
FIG. 4 is a detailed block diagram of the controller of the flight management system of FIG. 3, according to the inventive concepts disclosed herein.

Referring now to FIG. 4, the activities of the controller 112 are shown in greater detail according to the inventive concepts disclosed herein. As described above, the controller 112 may generally be configured to calculate a driftdown flight plan and provide the driftdown flight plan for display for the pilot of the aircraft. Of course, the controller 112 may further be responsible for other general aircraft-related functionality.

The controller 112 generally includes a processor 124 and memory 126. The processor 124 may be implemented as a specific purpose processor, an application specific integrated circuit (ASIC), one or more field programmable gate arrays (FPGAs), a group of processing components, or other suitable electronic processing components. The memory 126 is one or more devices (e.g., RAM, ROM, flash memory, hard disk storage) for storing data and computer code for completing and facilitating the various user or client processes, layers, and modules described in the present disclosure. The memory 126 may be or include volatile memory or non-volatile memory and may include database components, object code components, script components, or any other type of information structure for supporting the various activities and information structures of the inventive concepts disclosed herein. The memory 126 is communicably connected to the processor 124 and includes computer code or instruction modules for executing one or more processes described herein. The controller 112 further includes a communications interface 128 configured to facilitate communications between the controller 112 and the other aircraft systems. It should be understood that in alternative embodiments, the activities of one or more modules shown in the memory 126 may be executed at other aircraft systems and provided to the controller 112 for use in calculating the driftdown flight plan and generate the display of the driftdown flight plan.

The memory 126 is shown to include an engine failure module 130. The engine failure module 130 may detect a multiple engine failure of the aircraft 106. The controller 112 may receive inputs from various sensors 114 and the flight monitoring system 120, and the engine failure module 130 may determine from the input if the engines of the aircraft have failed. For example, the engine failure module 130 may detect a malfunction causing the engines to no longer operate. As another example, the engine failure module 130 may detect an out of fuel scenario or a fuel flow issue that is preventing or will prevent the engines from operating. The detection of an engine failure by the engine failure module 130 may be used to trigger the calculation of a driftdown flight plan as described in the present disclosure. In other embodiments, other conditions may cause the calculation of the driftdown flight plan.

The memory 126 is shown to include an aircraft performance module 140 that evaluates the performance of the aircraft in the engine failure scenario. The aircraft performance module 140 may receive aerodynamic attributes relating to the aircraft 106 and environmental attributes relating to the environment around the aircraft 106, and use the attributes to predict the aircraft performance. For example, the aircraft performance module 140 may estimate how far the aircraft 106 can travel before reaching the ground, how fast the aircraft 106 will descend, and the like. Such information may be used by other modules as described below to determine a range or area that the aircraft 106 can reach in the engine failure scenario.

The aircraft performance module 140 may calculate an aerodynamic status (shown as aerodynamic status module 142). The aerodynamic status module 142 may receive one or more aircraft attributes that may impact the aircraft while the aircraft is gliding. For example, the aerodynamic status module 142 may evaluate a current speed of the aircraft and determine how far the aircraft 106 can travel before reaching the ground. The aircraft performance module 140 may further calculate an environmental impact on the aircraft (shown as environmental status module 144). The environmental status module 144 may receive one or more environmental attributes that may impact the aircraft while the aircraft is gliding. For example, the environmental status module 144 may determine a current wind condition via the weather radar system 116, which impacts the aircraft 106 speed and direction. As another example, the environmental status module 144 may determine an impact of the current temperature or precipitation on the aircraft 106.

The aircraft performance module 140 may estimate the impact of the lift and drag on the airplane. The lift force on the aircraft 106 may allow the aircraft 106 to stay airborne for a longer period of time, while the drag force on the aircraft 106 may cause the aircraft 106 to descend at a faster rate.

Using the aerodynamic status and environmental status, the aircraft performance module 140 determines a descent rate of the aircraft, and the range of the aircraft (e.g., via aircraft descent rate module 128). In some embodiments, the descent rate of the aircraft is dynamically updated over time as the aircraft descends such that changes in physical properties of the aircraft, environmental factors, and differences in terrain are considered. For example, in some embodiments, a first descent rate of the aircraft for a first altitude (e.g., current altitude) is determined based on current characteristics of the aircraft, environment, and terrain affecting the descent of the aircraft, and then a future descent rate of the aircraft for a second altitude (e.g., future altitude, at a point at which the aircraft has descended a threshold altitude below the current altitude) is determined. In this way, a descent rate of the aircraft can be determined for a plurality of altitude segments making up the descent path of the aircraft from a current altitude of the aircraft to the ground level. The aircraft performance module 140 may determine one or two different type of ranges based on the descent rate. As one example, an implementation of the flight management system 110 may determine a landing area for the aircraft generally straight ahead of the aircraft (i.e., a landing area that can be reached by the aircraft with minimal turning or navigation). In such an implementation, the aircraft descent rate module 146 may determine a range ahead of the aircraft 106 that the aircraft is able to reach before descending to the ground. Referring again to FIG. 2, an area substantially ahead of the aircraft 106 is illustrated as a potential driftdown range of the aircraft 106. As another example, an implementation of the flight management system 110 may determine a landing area completely surrounding the aircraft. This range may include areas behind the aircraft. As described with respect to the aerodynamic status module 142, an impact on the aircraft of a turn of the aircraft can be calculated. For example, an impact of a 45 degree turn, a 90 degree turn, a 135 degree turn, and so forth, may be calculated, and the aircraft descent rate module 146 may determine how far the aircraft 106 can travel once completing the turn. The range in such a scenario may differ based on how much the aircraft 106 turns and various environmental conditions (e.g., a wind direction may cause the aircraft 106 to descend at a faster rate if the aircraft 106 turns in a particular direction with respect to the wind).

The memory 126 is shown to include a target landing module 132. The target landing module 132 determines one or more suitable landing locations for the aircraft 106. For example, the target landing module 132 may identify one or more airports that the aircraft 106 is capable of reaching during a driftdown. The target landing module 132 may receive information indicative of the landing locations from an aircraft system or from an external system 122. As another example, the target landing module 132 may identify one or more areas of terrain suitable for landing the aircraft 106. The target landing module 132 may receive map information from a GPS or other geographic terrain system onboard the aircraft 106, and may identify suitable landing locations based on the terrain, or may receive such information from an external system 122. The target landing module 132 may be further configured to identify all suitable landing locations within the range of the aircraft, a set number of landing locations (e.g., the five locations closest to the aircraft, the five locations that require the least pilot input to reach for landing), and a best or most optimal landing location. For example, a pilot may enable a feature that displays the five locations closest to the aircraft or most suitable for the aircraft 106 based on a characteristic of the aircraft 106 and environmental factor.

The memory 126 is shown to include a driftdown flight plan module 134. For a particular landing location, the driftdown flight plan module 134 calculates a driftdown flight plan that allows the aircraft 106 to land at the landing location. The driftdown flight plan may account for one or more turns of the aircraft 106 to orient itself with the landing location, and for the various aerodynamic and environmental attributes described herein. The driftdown flight plan may include a route, a target landing location, and a vertical path angle for the aircraft to take to reach the landing location.

In one embodiment, the driftdown flight plan includes an initial turn to orient the aircraft 106 in the direction of the landing location. For example, the aircraft 106 may need to turn 90 degrees or even 180 degrees to travel in the direction of a particular landing location. The driftdown flight plan may account for the loss in altitude and velocity that occurs when the aircraft 106 completes the turn. The driftdown flight plan may determine a constant descent rate of the aircraft as the aircraft travels towards the landing location. The driftdown flight plan may account for a second turn to orient the aircraft 106 with the landing location (e.g., lining up the aircraft with an airport runway or a waypoint). The aircraft 106 may need to complete the second turn by a certain time (e.g., by the time the aircraft reaches 5000 feet in altitude) to ensure the aircraft can reach the landing location and to ensure that the aircraft can land smoothly). At each step, the driftdown flight plan may account for various aerodynamic attributes, environmental attributes, and for the amount of time the aircraft can glide before reaching the ground.

In some embodiments, driftdown flight plans are calculated for multiple possible landing locations. In one embodiment, the driftdown flight plan module 134 or the target landing module 132 selects a most optimal driftdown flight plan for the aircraft 106. In some embodiments, the selected driftdown flight plan may be a driftdown flight plan that is the most easily executed by the pilot, the closest landing location to the aircraft, or otherwise. In other embodiments, the flight management system 110 enables a pilot to provide an input of which driftdown flight plan the pilot wishes to implement.

The driftdown flight plan module 134 is configured to update a driftdown flight plan at regular intervals. For example, the driftdown flight plan may be updated every ten seconds, every thirty seconds, every minute, every three minutes, or other time frame. In another example, the driftdown flight plan may be updated at every 1000 foot drop in altitude, every ten seconds, based on an interval based on an aerodynamic characteristics of the aircraft 106, and based on a change in an environmental condition (e.g., wind conditions, temperature, humidity) local to the aircraft or within the flight path of the aircraft 106. Updating the driftdown flight plan enables the pilot to receive constant feedback during the landing process and to automatically adjust for conditions that the pilot would otherwise have to estimate.

The memory 126 includes a display module 136 for rendering a display on one or more of the flight displays 102. The displays may generally include one or more driftdown flight plans and associated landing locations as well as other information relating to a driftdown flight plan (e.g., weather conditions, velocity of the aircraft 106). In some embodiments, only one or more driftdown flight plans are displayed (e.g., when locations of runways or airports are unknown). For example, referring to FIGS. 5-6, two example flight displays 200, 250 are shown, which illustrate an example display for two different implementations of the flight management system 110.

As described above, two possible implementations of the flight management system 110 may be utilized. In a first implementation, shown in FIG. 5, a driftdown flight plan may be generated for a landing location located generally in front of or straight ahead of the aircraft. In a second implementation, shown in FIG. 6, a driftdown flight plan may be generated for a landing location 204 in any position around the aircraft (e.g., behind the aircraft, to the left of the aircraft, to the right of the aircraft) but still within the range of the aircraft.

In the first implementation, a range (identified in FIG. 5 by a border 202) ahead of the aircraft is determined by the aircraft performance module 140. This area or range may account for no or minimal turns by the aircraft during a driftdown, and may further account for aerodynamic and/or environmental attributes (e.g., lift and drag) that impact the rate at which the aircraft descends. In one embodiment, the range may be a circular area around the aircraft with a fixed radius. One or more landing locations 204 may be identified on the display, and the pilot may select a landing location, or the flight management system 110 may automatically select a best or most optimal landing location based on the best or most optimal landing location (e.g., the closest landing location, the landing location requiring the least number of maneuvers by the pilot to reach, the landing location requiring the least difficult maneuvers by the pilot to reach). Other landing locations may still be displayed, along with other driftdown information (e.g., current status of the aircraft, current weather conditions) that may be relevant to the pilot.

In the second implementation, a range (identified in FIG. 6 by border 252) around the aircraft is identified by the aircraft performance module 140. As compared to the uniform range shown in FIG. 5, the range shown in FIG. 6 is varies as a result of at least one landing location requiring the aircraft to turn one or more times for the aircraft to reach the landing location. For example, the aircraft cannot travel as far of a horizontal distance behind the aircraft as the aircraft can travel forwards, because the aircraft will driftdown at a greater rate when turning than when traveling straight ahead without making a maneuver. As another example, a wind condition (e.g., a wind coming from the aircraft's left side) is may affect the range of the aircraft's maximum horizontal travel distance to be predominantly forward and to the right of the aircraft. Similar to FIG. 5, the display may identify one or more landing locations 204, an optimal landing location, and other general driftdown information.

Figure 5:
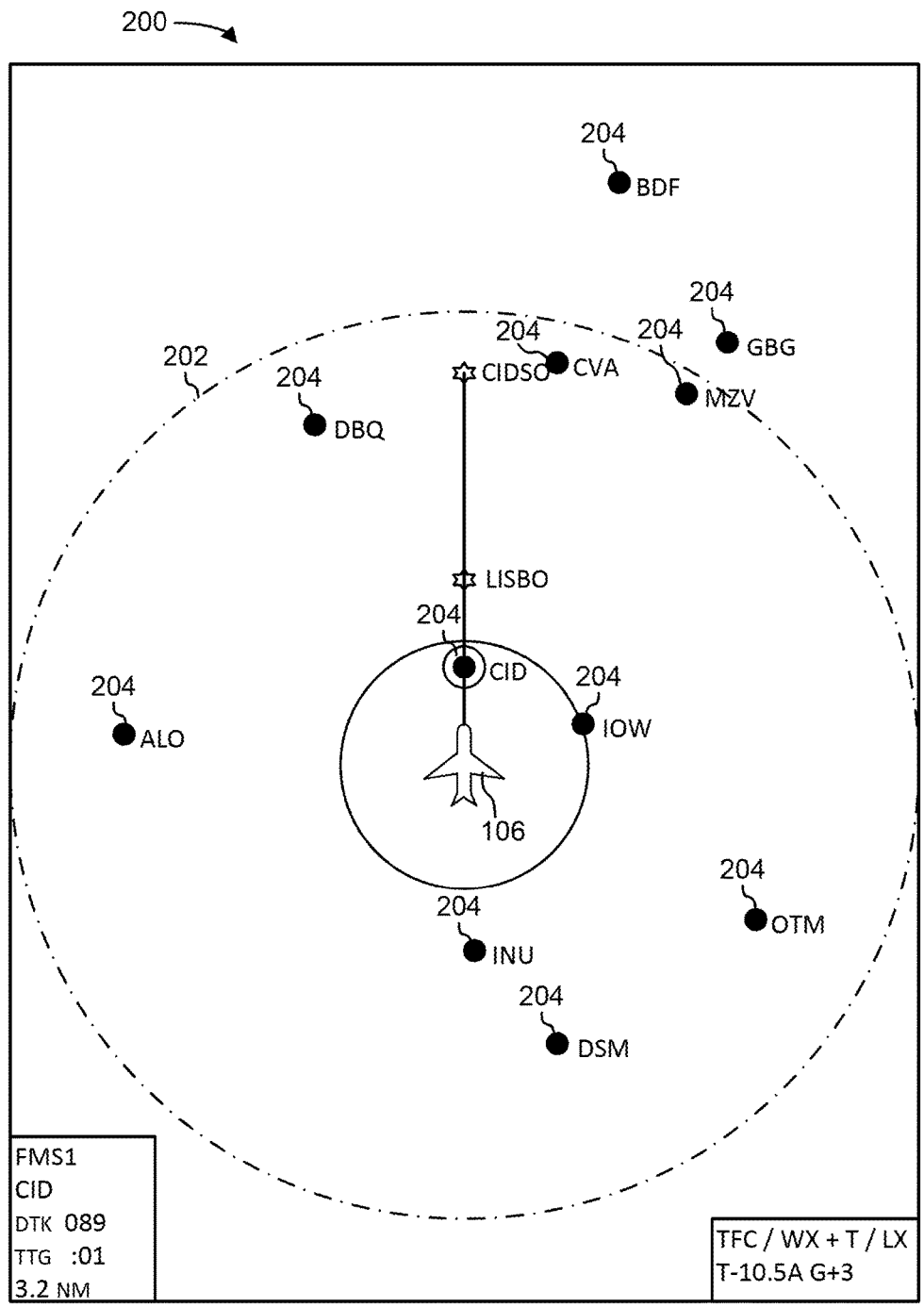
FIG. 5 is an example display of a driftdown flight plan for the aircraft determined by the flight management system of FIG. 3, according to the inventive concepts disclosed herein.
Figure 6:
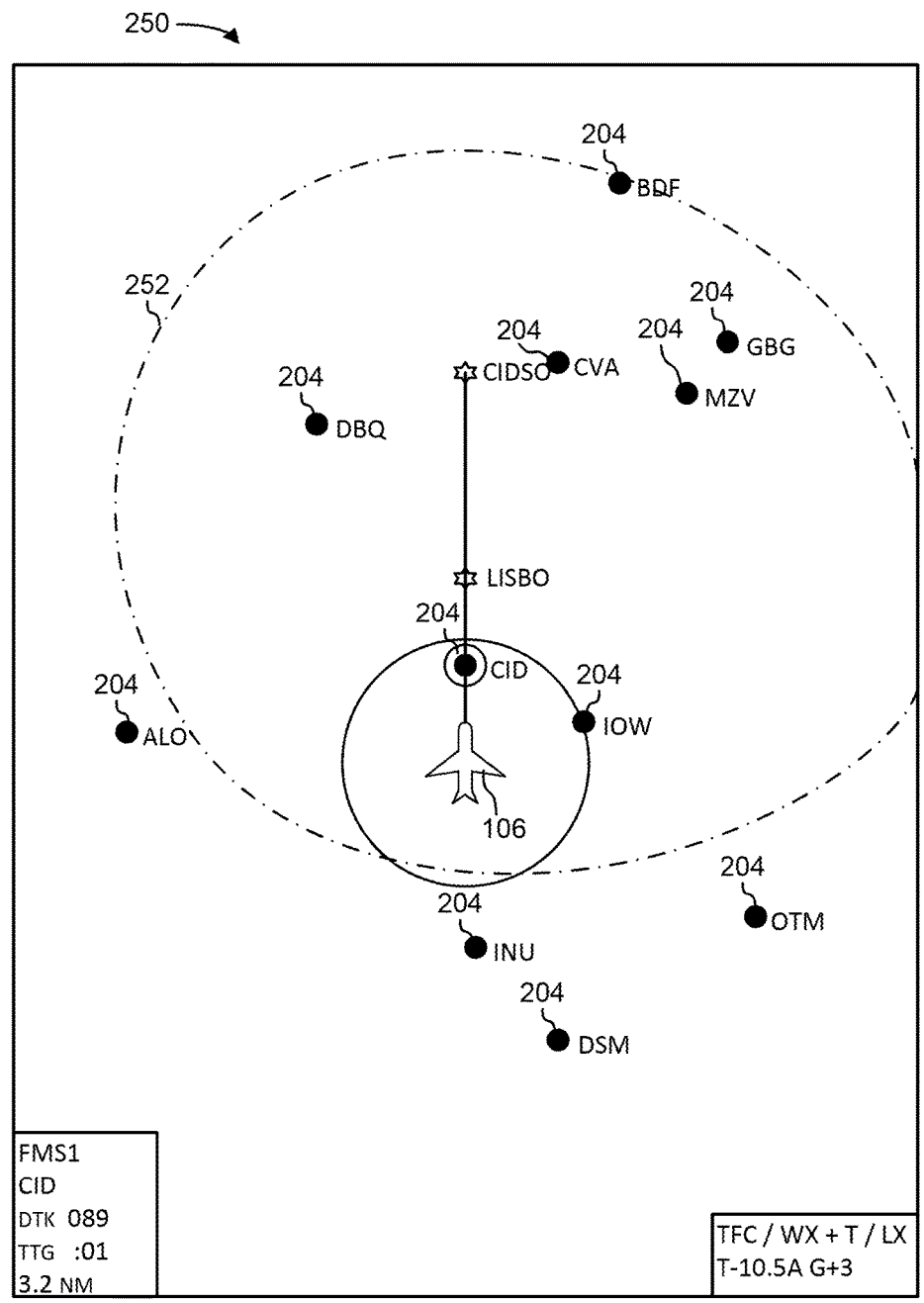
FIG. 6 is another example display of a driftdown flight plan for the aircraft determined by the flight management system of FIG. 3, according to the inventive concepts disclosed herein.

It should be understood that the displays of FIGS. 5-6 may use any type of shading, coloring, highlighting, or other features to illustrate various information. For example, the display may distinguish between landing locations that are reachable from those that are not reachable, the display may highlight one or more routes, or the like. In some embodiments, the display provides information relating to the range of the aircraft (e.g., range ring 202, range area 252). In some embodiments, a range ring 202 or range area 252 is displayed if there are no airports known to be within range of the aircraft (e.g., due to a navigation database not including an airport or landing location). The range ring 202 or range area 252 may be overlaid on displayed terrain and provide an indication of a location of level terrain. For example, if the aircraft cannot safely reach a known runways or airport, the pilot of the aircraft may refer to a displayed range ring 202 overlaid on displayed terrain to determine an alternate landing location or a location for a crash landing (e.g., a location with terrain features most suitable for a crash landing, such as flat terrain with no trees or large rocks).

Figure 7:
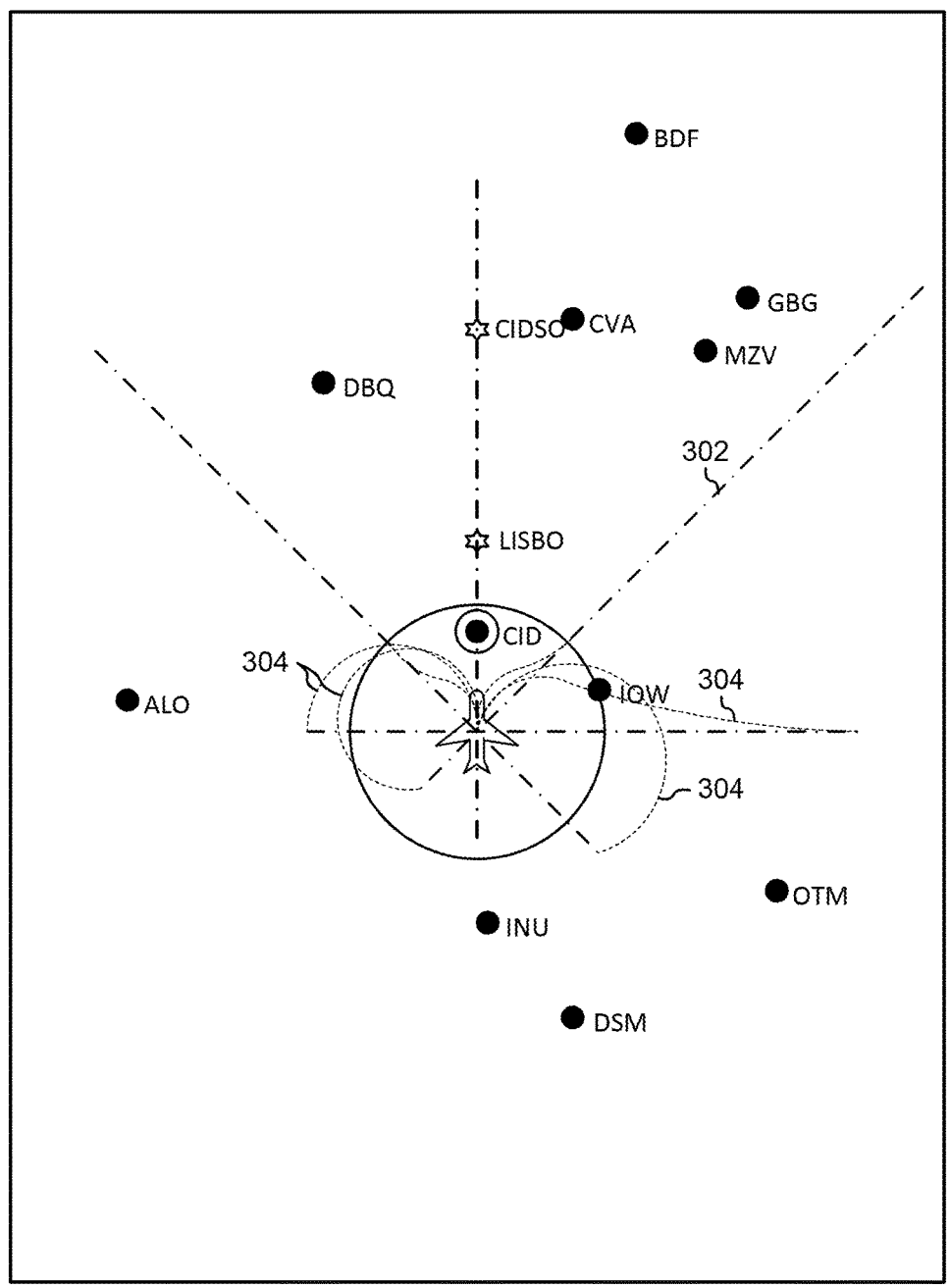
FIG. 7 is an example illustration of multiple driftdown flight plans for an aircraft determined by the flight management system of FIG. 3, according to the inventive concepts disclosed herein.

As described above, a plurality of driftdown flight plans may be calculated. Referring now to FIG. 7, the process of calculating the plurality of driftdown flight plans is illustrated in greater detail. In one embodiment, the flight management system 110 is configured to calculate a first driftdown flight plan straight forward from the current position of the aircraft, and another driftdown flight plan in a plurality of directions at different intervals. For example, in one embodiment, the flight management system 110 calculates eight driftdown flight plans, each plan at a 45 degree interval from one another. While the present disclosure uses a 45 degree interval to illustrate inventive concepts disclosed herein, it should be appreciated that any number of driftdown flight plans at any number of intervals may be calculated, and further that the intervals may or may not be equidistant and may be set based on any aerodynamic or environmental attribute, or based on the location of one or more potential landing locations.

As illustrated by FIG. 7, a total of eight driftdown flight plans in eight different directions 302 (illustrated as dot-dashed lines) are analyzed, each at a 45 degree interval from another flight plan. For each direction 302, the flight management system 110 estimates the turn required to orient the aircraft 106 toward the direction 302. For example, multiple turn paths 304 are shown, each turn path illustrating a path for the aircraft 106 to travel on a particular direction 302. The flight management system 110 may estimate the length of time for the aircraft 106 to finish the turn, and the resulting estimated loss in altitude and velocity as a result of the turn. In some embodiments, the flight management system 110 determines that the aircraft 106 cannot complete a turn and arrive at a landing location before drifting down to the ground.

Based on the impact of the turn on the aircraft 106, the aircraft 106 may not be able to reach some landing locations, since the aircraft will lose altitude and velocity when executing the maneuver. For example, a target landing module 132 may be configured to identify the five nearest landing locations, but if the aircraft 106 has to turn to reach some or all of the landing locations, the landing module may determine that one or more of the locations may be unreachable due to the velocity of the aircraft decreasing should the aircraft carryout the maneuver. For example, referring also to FIG. 6, a landing location "INU" is shown outside the range of the aircraft 106 despite being closer to the aircraft than, for example, a location "GBG" shown within the range of the aircraft.

If the aircraft 106 can orient itself in a given direction before reaching the ground, the flight management system 110 may then calculate a range for the aircraft based on the new heading, velocity, and altitude of the aircraft 106. The flight management system 110 may determine a constant descent rate for the aircraft based on the new heading until the aircraft reaches a threshold altitude. Since the aircraft may have to execute a second maneuver (e.g., another turn) to orient itself with a landing location (e.g., turning to line up with an airport runway), the flight management system 110 also calculates the impact of the second turn on the aircraft. For example, in one embodiment, finishing a second turn before the aircraft reaches an altitude of 5000 feet may be more desirable (e.g., as extra drag force on the aircraft below 5000 feet may cause the aircraft to descend more rapidly).

Figure 8:
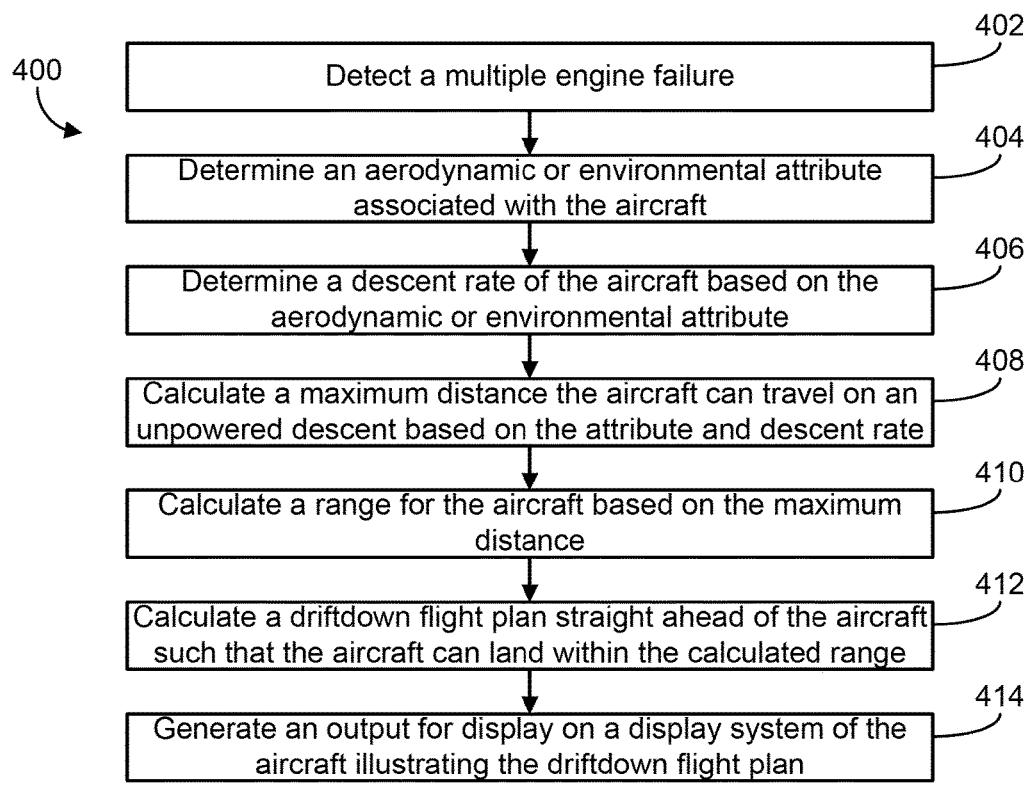
FIG. 8 is a flow diagram of a method for calculating a driftdown flight plan for the aircraft, according to the inventive concepts disclosed herein.

Referring now to FIG. 8, a flow diagram of a method for calculating a driftdown flight plan for an aircraft is shown according to the inventive concepts disclosed herein. The method 400 may be executable by, for example, the flight management system 110, for determining a driftdown flight plan ahead of an aircraft. The method 400 may include one or more of the following steps.

A step 402 may include detecting a multiple engine failure. The detection of the multiple engine failure may include, for example, detecting an engine malfunction, detecting an out-of-fuel scenario, a fuel flow issue, or the like. Upon detection of the multiple engine failure, the flight management system 100 determines that a driftdown flight plan is necessary for the aircraft to safely reach a landing location.

A step 404 may include determining an aerodynamic or environmental attribute associated with the aircraft 106. For example, an aerodynamic attribute may include a current speed of the aircraft 106, a current altitude of the aircraft 106, the impact of lift and drag on the range of the aircraft 106, and the like. An environmental attribute may include, for example, a wind speed and direction, a temperature, precipitation type or rate, and the like. A step 406 may include determining a descent rate of the aircraft 106 based on the aerodynamic or environmental attribute. The descent rate may characterizes how quickly the aircraft will descend without thrust from an engine. The determined descent rate may be a minimum descent rate (e.g., a descent rate which maximizes the amount of time the aircraft is able to stay airborne). The descent rate can increased by one or more actions by the pilot of the aircraft 106. A step 408 includes calculating a maximum distance the aircraft 106 can travel on an unpowered descent based on the attribute and descent rate.

A step 410 may include calculating a range for the aircraft based on the maximum distance. For example, a range may be calculated forward of the aircraft to identify an area the aircraft can reach without making any substantial turns. A step 412 may include calculating a driftdown flight plan straight ahead of the aircraft such that the aircraft can land within the calculated range. Step 412 may include, for example, identifying a target (e.g., a landing location) within the range of the aircraft and calculating a driftdown flight plan for reaching the landing location. The driftdown flight plan may define a path to the landing location, a vertical path angle of the aircraft to the landing location, and other information that can be used by a pilot to direct the aircraft to the landing location.

A step 414 may include generating an output for display on a display system of the aircraft to illustrate the driftdown flight plan. For example, referring also to FIG. 5, an example display is shown.

Figure 9:
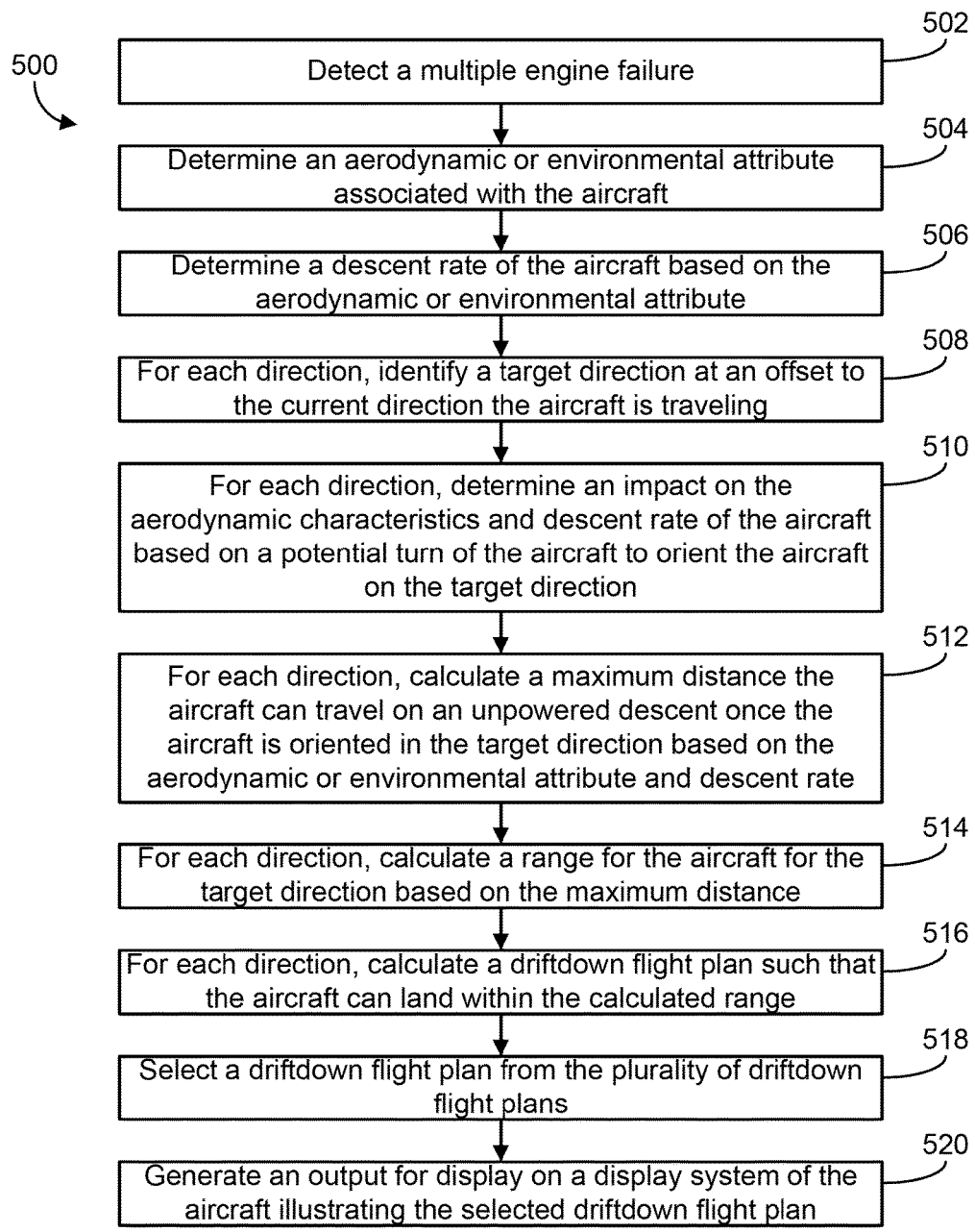
FIG. 9 is a flow diagram of a method for calculating multiple driftdown flight plans in a plurality of directions for the aircraft, according to the inventive concepts disclosed herein.

Referring now to FIG. 9, a flow diagram of a method for calculating multiple driftdown flight plans for a plurality of directions for an aircraft is shown according to the inventive concepts disclosed herein. The method 500 may be executable by, for example, the flight management system 110. The method 500 may include one or more of the following steps.

A step 502 may include detecting a multiple engine failure. The detection of the multiple engine failure may include, for example, detecting an engine malfunction, detecting an out-of-fuel scenario, a fuel flow issue, or the like. Upon detection of the multiple engine failure, the flight management system 110 determines that a driftdown flight plan is necessary for the aircraft.

A step 504 may include determining an aerodynamic or environmental attribute associated with the aircraft. For example, an aerodynamic attribute may include a current speed of the aircraft, a current altitude of the aircraft, the impact of lift and drag on the aircraft, and the like. An environmental attribute may include, for example, a wind speed and direction, a temperature, precipitation type or rate, and the like. A step 506 may include determining a descent rate of the aircraft based on the aerodynamic or environmental attribute. The descent rate characterizes how fast the aircraft will descend without any thrust from an engine. The determined descent rate may be a minimum descent rate (e.g., a descent rate which maximizes the amount of time the aircraft is able to stay airborne). The descent rate can be increased by one or more actions by the pilot of the aircraft.

The method 500 may include identifying a plurality of directions in which the aircraft can travel to reach a landing location within range for the aircraft. A step 508 may include, for each direction, identifying a target direction at an offset to the current direction the aircraft is traveling. For example, target directions may be established at 45 degree intervals from one another, resulting in a total of eight possible directions. It should be appreciated that any other number of intervals may be used, and that the intervals may be equidistant or variable as described herein.

A step 510 may include, for each direction, determining an impact on the aerodynamic characteristics and descent rate of the aircraft based on a potential turn of the aircraft to orient the aircraft on the target direction. For example, the loss of altitude and velocity of the aircraft while executing the turn may be estimated. As another example, the change in lift or drag on the aircraft may be estimated. Furthermore, aerodynamic and environmental attributes may impact the ability of the aircraft to execute such a turn.

A step 512 may include calculating a maximum distance the aircraft can travel during an unpowered descent once the aircraft is oriented in the target direction based on the aerodynamic or environmental attribute and descent rate. The maximum distance may be calculated to account for an additional turn of the aircraft. For example, a distance the aircraft can travel on an unpowered descent once the aircraft is oriented in the target direction is calculated to enable the aircraft to reach a first target elevation. Then, in order to line up with the target, an impact on the aerodynamic characteristics and descent rate of the aircraft is calculated. In some embodiments, the turn is directed to be completed before the aircraft reaches a second target elevation.

A step 514 may include calculating a range for the aircraft for the target direction based on the maximum distance. A step 516 may include calculating the driftdown flight plan such that the aircraft can land at a target location within the calculated range.

A step 518 may include selecting a driftdown flight plan from the plurality of driftdown flight plans. The selection may be based on a driftdown flight plan that is most easily executable by the pilot or a driftdown flight plan that directs the aircraft to a closest landing location. In various embodiments, more than one driftdown flight plan may be selected, or the pilot may select one or more driftdown flight plans for use. A step 520 may include generating an output for display on a display system of the aircraft illustrating the selected driftdown flight plan. For example, as illustrated in FIG. 6, an example display is shown.

As will be appreciated from the above, the embodiments of the inventive concepts disclosed herein may be used to assist a pilot in an emergency scenario such as an engine failure scenario. The inventive concepts disclosed herein may identify suitable landing locations for the aircraft and a driftdown flight plan for reaching the landing locations. The inventive concepts help automate the process of landing an aircraft during an emergency scenario, greatly assisting the pilot in determining which landing location is most suitable to land the aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for assisting an aircraft in an emergency landing, the system comprising:
at least one processor with a non-transitory processor-readable medium storing processor-executable code for causing the at least one processor to:
determine an all engine failure of an aircraft; and
in response to the determined all engine failure:
determine an attribute associated with the aircraft and a descent rate of the aircraft based on the attribute, wherein the attribute is at least one of an aerodynamic attribute and an environmental attribute;
calculate, for a plurality of directions, a maximum distance the aircraft can travel without engine power due to the all engine failure based on a maneuver for traveling in the direction and based on at least one of the attribute and the descent rate;
select a driftdown flight plan from among a plurality of generated driftdown flight plans, the plurality of generated driftdown flight plans based on the maximum distance; and
generate a display of the selected driftdown flight plan and provide the generated display to a user via a display system of the aircraft.

2. The system of claim 1, wherein the processor-executable code further causes the at least one processor to calculate a driftdown flight plan for the aircraft based on the maximum distance of the aircraft, wherein the descent rate is a minimum descent rate that varies according to a change in altitude of the aircraft and lateral distance traveled due to a change in at least one of an aircraft performance characteristic and an environmental condition.

3. The system of claim 2, wherein the processor-executable code further causes the at least one processor to update the driftdown flight plan as the aircraft descends based on a change in the aerodynamic attribute.

4. The system of claim 3, wherein the driftdown flight plan is recalculated at a cyclic rate.

5. The system of claim 1, wherein the attribute comprises at least one of an altitude, a temperature, a wind attribute, an aircraft speed, lift, drag, a weather condition, or a weight of the aircraft.

6. The system of claim 1, wherein the driftdown flight plan comprises a target and a vertical path angle to the target.

7. The system of claim 6, wherein the target comprises an airport or other landing location.

8. A system for assisting an aircraft in an emergency landing, the system comprising:
at least one processor with a non-transitory processor-readable medium storing processor-executable code for causing the at least one processor to:
determine an all engine failure of an aircraft; and
in response to the determined all engine failure:
determine an attribute associated with the aircraft and a descent rate of the aircraft based on the attribute, wherein the attribute is at least one of an aerodynamic attribute and an environmental attribute;
calculate, for a plurality of directions, a maximum distance the aircraft can travel based on a maneuver for traveling in the direction and based on at least one of the attribute and the descent rate, wherein each direction of the plurality of directions is associated with a landing location;
generate, for each of the plurality of directions, a driftdown flight plan based on the maximum distance the aircraft can travel in the direction and based on the location of the landing location associated with the direction;
select a driftdown flight plan from one of the driftdown flight plans; and
generate a display of the selected driftdown flight plan and provide the display to a display system of the aircraft.

9. The system of claim 8, wherein calculating each driftdown flight plan comprises identifying a target direction at an offset to the current direction the aircraft is traveling and determining an impact on the aerodynamic attribute and the descent rate of the aircraft based on an aircraft maneuver to orient the aircraft with the target direction.

10. The system of claim 9, wherein calculating each driftdown flight plan further comprises calculating a maximum distance the aircraft can travel without engine power due to the all engine failure once the aircraft is oriented in the target direction based on at least one of the aerodynamic or environmental attribute and based on the descent rate.

11. The system of claim 10, wherein calculating each driftdown flight plan further comprises calculating the driftdown flight plan such that the aircraft can land within the calculated maximum distance.

12. The system of claim 11, wherein the driftdown flight plan for each direction comprises a target and a vertical path angle to the target.

13. The system of claim 11, wherein calculating each driftdown flight plan further comprises:
calculating a distance the aircraft can travel without engine power due to the all engine failure once the aircraft is oriented in the target direction, based on the aerodynamic attribute and the descent rate, down to a first target elevation;
calculating an impact on the aerodynamic attribute and the descent rate of the aircraft to a second target elevation, based on an additional aircraft maneuver to orient the aircraft with the target direction; and
calculating a driftdown flight plan from the second target elevation to the ground.

14. The system of claim 13, wherein the second target elevation is 5000 feet, and wherein the first target elevation is calculated such that the aircraft maneuver is finished at the second target elevation.

15. The system of claim 8, wherein the plurality of directions are chosen at a number of equidistant angles around the aircraft.

16. The system of claim 8, wherein the driftdown flight plan is updated as the aircraft descends based on a change in the aerodynamic attribute.

17. The system of claim 16, wherein the driftdown flight plan is calculated every time the aircraft descends an additional 1000 feet.

18. A method for assisting an aircraft in an emergency landing, the method comprising:
   determining, by a processor of an aircraft, an all engine failure of the aircraft; and
   in response to the determined all engine failure:
      determining, by the processor, an attribute associated with the aircraft and a descent rate of the aircraft based on the attribute, wherein the attribute is at least one of an aerodynamic attribute and an environmental attribute;
      calculating, by the processor, for a plurality of directions, a maximum distance the aircraft can travel without engine power due to the all engine failure based on a maneuver for traveling in the direction and based on at least one of the attribute and the descent rate;
      selecting, by the processor, a driftdown flight plan from among a plurality of generated driftdown flight plans, the plurality of generated driftdown flight plans based on the maximum distance; and
      generating, by the processor, a display of the selected driftdown flight plan and providing the generated display to a user via a display system of the aircraft, wherein the generated display includes a depiction of a landing area for the aircraft.

19. The method of claim 18, further comprising calculating, by the processor, a driftdown flight plan for the aircraft based on the maximum distance of the aircraft, and wherein the descent rate is a minimum descent rate.

20. The method of claim 19, further comprising updating, by the processor, the driftdown flight plan as the aircraft descends based on a change of the aerodynamic attribute, wherein the driftdown flight plan is calculated every time the aircraft descends 1000 feet.

\* \* \* \* \*